United States Patent
Dumas et al.

(10) Patent No.: US 10,970,853 B2
(45) Date of Patent: Apr. 6, 2021

(54) DETERMINING METHOD OF A VIRTUAL VELOCITY VECTOR OF A MOBILE ENGINE, ASSOCIATED COMPUTER PROGRAM PRODUCT AND DETERMINING SYSTEM

(71) Applicant: Thales, Courbevoie (FR)

(72) Inventors: Pierre-Yves Dumas, Valence (FR);
Emmanuel Nguyen, Valence (FR);
Christian Mehlen, Valence (FR)

(73) Assignee: THALES, Courbevoie (FR)

( * ) Notice: Subject to any disclaimer, the term of this patent is extended or adjusted under 35 U.S.C. 154(b) by 121 days.

(21) Appl. No.: 16/186,594

(22) Filed: Nov. 12, 2018

(65) Prior Publication Data
US 2019/0147603 A1    May 16, 2019

(30) Foreign Application Priority Data

Nov. 16, 2017  (FR) ...................... 1701185

(51) Int. Cl.
| | |
|---|---|
| *G06T 7/246* | (2017.01) |
| *G06T 7/70* | (2017.01) |
| *G06T 7/20* | (2017.01) |
| *G01C 21/16* | (2006.01) |
| *G01S 19/52* | (2010.01) |

(52) U.S. Cl.
CPC ............... *G06T 7/248* (2017.01); *G06T 7/20* (2013.01); *G06T 7/70* (2017.01); *G01C 21/16* (2013.01); *G01S 19/52* (2013.01); *G06T 2207/10032* (2013.01); *G06T 2207/30241* (2013.01)

(58) Field of Classification Search
None
See application file for complete search history.

(56) References Cited

U.S. PATENT DOCUMENTS

| | | | |
|---|---|---|---|
| 2017/0358103 A1* | 12/2017 | Shao | ................ B64C 39/024 |
| 2018/0120111 A1* | 5/2018 | Petillon | ................ G01C 21/165 |

FOREIGN PATENT DOCUMENTS

EP    2 405 399 A1    1/2012

OTHER PUBLICATIONS

French Patent Application No. 17 01185, Rapport de Recherche Préliminaire, dated May 11, 2018, 3 pages.
Zachariah et al., "Self-motion and wind velocity estimation for small scale UAVs", IEEE International Conference on Robotics and Automation (ICRA), May 9, 2011, pp. 1166-1171.
Zachariah et al., "Camera-aided inertial navigation using epipolar points", Position, Location and Navigation Symposium (PLANS), May 4, 2010, pp. 303-309, IEEE, Piscataway, NJ, USA.

* cited by examiner

*Primary Examiner* — Leon Viet Q Nguyen
(74) *Attorney, Agent, or Firm* — Soquel Group LLC

(57) ABSTRACT

This method for determining a virtual speed vector includes the steps of acquiring (110) a sequences of images of the surrounding environment from an image sensor defining an optical projection center that is substantially stationary relative to the mobile engine, analyzing (120) at least two successive images in order to determine, in each of the two images, a point, called epipole, representing the position in said image of the optical center of the image sensor at the moment of the acquisition of the other image, and for each analyzed image, determining (130) the position of the epipole of said image on a display usable to pilot the mobile engine and displaying (130), on the display, a symbol representative of the virtual speed vector in said position.

12 Claims, 4 Drawing Sheets

# DETERMINING METHOD OF A VIRTUAL VELOCITY VECTOR OF A MOBILE ENGINE, ASSOCIATED COMPUTER PROGRAM PRODUCT AND DETERMINING SYSTEM

FIELD OF THE INVENTION

The present invention relates to a method for determining a virtual speed vector of a mobile engine.

The present invention also relates to an associated computer program product and determining system.

BACKGROUND OF THE INVENTION

In the aeronautics field, the use of a speed vector, also called flight path vector or FPV, for piloting the aircraft is already known.

This vector makes it possible to present the pilot of the aircraft with information on the instantaneous path of the apparatus, and in particular to determine the drift and the flight path angle of the aircraft relative to a geographical coordinate system.

In general, this information is useful to the pilot to monitor the flight path angle of the aircraft, or associated with a depiction of the outside environment (relief or destination runway), to make sure that the aircraft is indeed following the provided path.

Currently, to calculate the speed vector, it is necessary to calculate speeds of the aircraft in a geographical coordinate system.

Such a calculation is traditionally done from information provided by a satellite positioning system, such as the GPS system or an on-board inertial unit. It is also known to use a hybridization of the information provided by these two systems, in particular in order to improve the quality of the results.

However, the use of these systems is faced with the issue of the integrity and precision of the information provided by these systems.

Indeed, the geographical speeds provided by an inertial unit have a high level of integrity, but are imprecise, whereas those provided by the GPS system are very precise, but lack integrity.

Furthermore, during a conform display to the pilot, in particular using a head-up display (HUD), the precision of the display of the speed vector relative to the outside environment plays a particularly significant role. Indeed, a minimal heading error (on the order of 1°) may cause a nonconformity of the projection of the speed vector on the head-up display and therefore relative to the outside environment, which is detrimental to piloting.

SUMMARY OF THE INVENTION

The present invention aims to propose a method for determining a virtual speed vector having good integrity and good precision, while being particularly well suited to a conform display.

To that end, the invention relates to a method for determining a virtual speed vector of an aircraft moving in a surrounding environment, the virtual speed vector showing the movement direction of the mobile engine in said environment.

The method includes the following steps:
acquiring a sequence of images of the surrounding environment from an image sensor oriented along an image acquisition direction and defining an optical projection center that is substantially stationary relative to the mobile engine;
analyzing at least two successive images in order to determine, in each of the two images, a point, called epipole, representing the position in said image of the optical center of the image sensor at the moment of the acquisition of the other image;
for each analyzed image, determining the position of the epipole of said image on a display usable to pilot the mobile engine and displaying, on the display, a symbol representative of the virtual speed vector in said position.

According to other advantageous aspects of the invention, the method comprises one or more of the following features, considered alone or according to all technically possible combinations:
the step for analyzing at least two images comprises the following sub-steps:
determining a plurality of reference points in one of the two images, called first image, and a plurality of reference points in the other image, called second image;
associating reference points between the first and second images;
from associated reference points, determining a fundamental matrix defining, for each point of the first image, a line in the second image, called epipolar line, on which the point of the second image corresponding to said point of the first image is located;
determining the epipole in the first image as the core of the fundamental matrix;
determining the epipole in the second image as the core of the transposed fundamental matrix;
the symbol representative of the virtual speed vector is displayed on the display in a conform manner, said display preferably being a head-up display;
the image sensor is mounted in the mobile engine such that the image acquisition direction substantially corresponds to the movement direction of the mobile engine;
the image sensor is mounted on the head of a pilot of the mobile engine;
the method further comprises a step for comparing the virtual speed vector with a reference speed vector determined from information provided by a satellite positioning system and/or an inertial sensor;
the method further comprises a step for comparing the virtual speed vector with the reference speed vector comprises the following sub-steps, implemented for each pair of analyzed successive images:
determining a first virtual speed corresponding to the movement speed of the optical center of the image sensor between the images of said pair;
determining a second virtual speed corresponding to the first virtual speed calculated in the coordinate system of the mobile engine;
determining, from the second virtual speed, a virtual drift component of the mobile engine and a virtual flight path angle component of the mobile engine by using the roll and pitch of the mobile engine;
determining, from the reference speed vector, a reference flight path angle component of the mobile engine and comparing said component with the virtual flight path component;
the step for comparing the virtual speed vector with the reference speed vector, which further comprises, for each pair of analyzed successive images, the sub-step for determining, from the reference speed vector and the heading of the mobile engine, a reference drift component and comparing said component with the visual drift component;

the step for comparing the virtual speed vector with the reference speed vector further comprises the following sub-steps, implemented for each pair of analyzed successive images:

determining a third virtual speed corresponding to the first virtual speed calculated in a geographical coordinate system;

determining, from the third virtual speed, a virtual track angle component of the mobile engine;

determining, from the reference speed vector, a reference track angle component of the mobile engine and comparing said component with the virtual track angle component;

the step for comparing the virtual speed vector with the reference speed vector that further comprises, for each pair of analyzed successive images, in case of a rotational movement of the mobile engine, the following preliminary sub-steps:

acquiring rotation angles of the image acquisition direction;

based on the acquired rotation angles, homographic transformation of one of the images of said pair to align the image direction corresponding to said image with that corresponding to the other image.

the mobile engine is an aircraft.

The invention also relates to a computer program product including software instructions which, when implemented by computer equipment, carry out the method as previously defined.

The invention also relates to a system for determining a virtual speed vector of the mobile engine, including means for carrying out the method as described above.

BRIEF DESCRIPTION OF THE DRAWINGS

These features and advantages of the invention will appear upon reading the following description, provided solely as a non-limiting example, and done in reference to the appended drawings, in which.

DETAILED DESCRIPTION OF THE INVENTION

Figure 1:
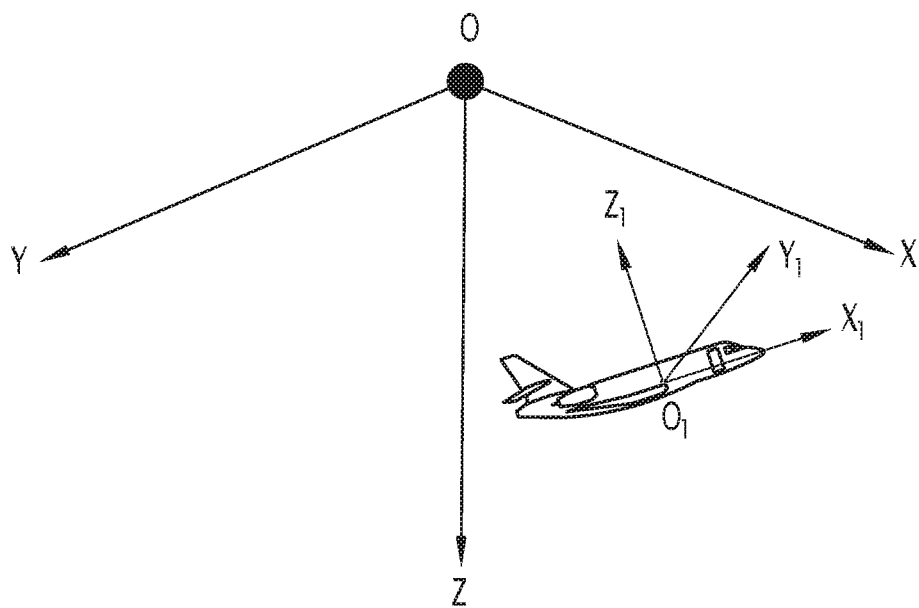
FIG. 1 is a schematic perspective view of a mobile engine moving in a surrounding environment.

In the example embodiment of FIG. 1, the mobile engine is an aircraft 10 such as an airplane, in particular a commercial airplane, piloted by at least one pilot.

However, in general, the mobile engine may correspond to any other engine moving substantially on the earth's surface or flying at least in the earth's atmosphere and able to be piloted by at least one pilot directly from the latter or remotely. Thus, the mobile engine can be a vehicle, a military airplane, a helicopter, a drone, etc.

In FIG. 1, the aircraft 10 moves in a surrounding environment relative to a geographical coordinate system XYZ with origin O.

This geographical coordinate system XYZ for example corresponds to the referential known as "North-East-Down". In this case, the axis OX extends along north direction, the axis OY along the east direction and the axis OZ along the vertical oriented toward the earth's surface. The plane formed by the axes OX and OY is called horizontal plane.

A coordinate system with origin $O_1$, called aircraft coordinate system $X_1Y_1Z_1$, is also associated with the aircraft 10 such that the axis $O_1X_1$ extends in the longitudinal direction of the aircraft 10, the axis $O_1Y1$ is located in the plane of the aircraft 10, is perpendicular to the axis $O_1X_1$ and extends to the left thereof, and the axis $O_1Z_1$ completes a direct right orthogonal coordinate system.

The aircraft coordinate system $X_1Y_1Z_1$ is then translatable and rotatable relative to the geographical coordinate system XYZ.

The orientation of the aircraft coordinate system $X_1Y_1Z_1$ relative to the geographical coordinate system XYZ defines the attitude of the aircraft 10. This attitude is in particular determined by the roll angle $\varphi$ of the aircraft 10 corresponding to the angle between the axis $O_1Y_1$ and the horizontal plane, and by the pitch angle $\theta$ of the aircraft 10 corresponding to the angle between the axis $O_1X_1$ and the horizontal plane.

The speed vector V of the aircraft 10 is defined as the movement speed of the point $O_1$ relative to the point O.

In the geographical coordinate system XYZ, the speed vector V can be written in the form $[V_N;V_E;V_D]^t$ where the component $V_N$ is called north speed, the component $V_E$ east speed and the component $V_D$ (also denoted $V_Z$) vertical speed.

It is also possible to define a horizontal speed $V_{hor}$ of the aircraft 10 corresponding to the projection of the speed vector V on the horizontal plane, a longitudinal speed $V_{long}$ corresponding to the projection of the speed vector V on the longitudinal axis $O_1X_1$ and a lateral speed $V_{lat}$ corresponding to the projection of the speed vector V on the axis $O_1Y_1$.

In the continuation of the description, the flight path angle of the aircraft 10, also called FPA, is defined as the angle between the vertical speed and the horizontal speed. This angle can then be determined as follows:

$$FPA = a\tan V_Z/V_{hor}.$$

The drift of the aircraft 10 is defined as the angle between the lateral speed and the longitudinal speed, the two speeds being projected on the horizontal plane. This angle can then be determined as follows:

$$\text{Drift} = a\tan V_{lat}/V_{long}.$$

The heading $\psi$ of the aircraft 10 is defined as the angle between the longitudinal axis $O_1X_1$ of the aircraft projected on the horizontal plane and the axis OX, i.e., the north direction.

The track of the aircraft 10 is defined as the projection of the movement of the aircraft over the horizontal plane.

The track angle is defined as the angle between the east speed and a speed projected over a reference angle, for example the north speed when it is not nil. This angle can be determined as follows:

$$\text{Track} = a\tan V_E/V_N.$$

It should be noted that the aforementioned terms are known by one skilled in the art and can be defined differently if applicable, in particular based on the chosen geographical coordinate system.

Figure 2:
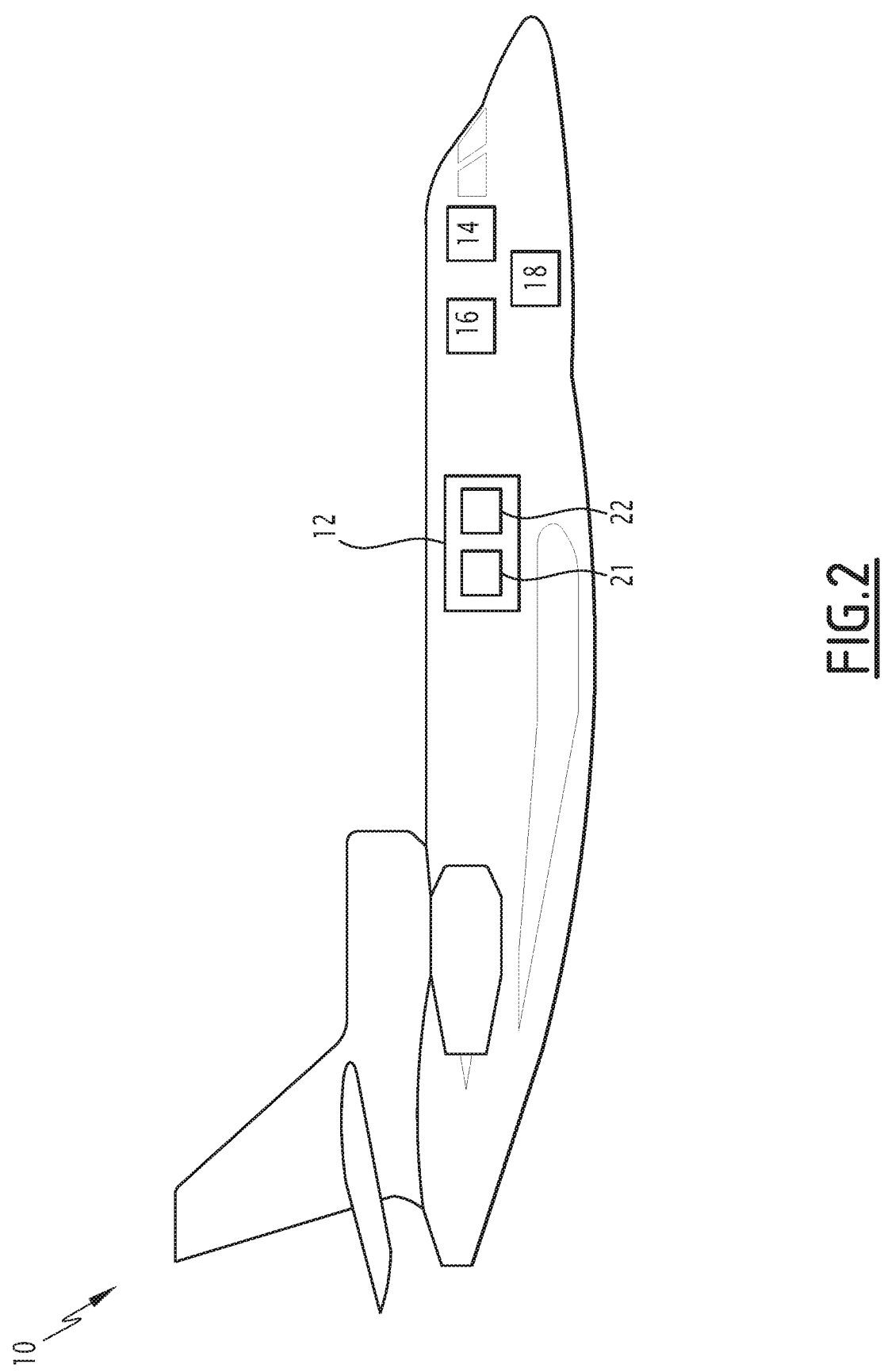
FIG. 2 is a schematic side view of the mobile engine of FIG. 1, the mobile engine including a determining system according to the invention.

In reference to FIG. 2, the aircraft 10 includes a navigation system 12, a display 14, an image sensor 16 and a system 18 for determining a virtual speed vector, according to the invention.

The navigation system 12 is known in itself and is configured to provide the pilot with information relative to the position and the speed of the aircraft 10.

Thus for example, the navigation system 12 comprises a radio signal receiver 21 and an inertial unit 22.

The receiver 21 makes it possible in particular to acquire radio signals from satellites belonging to a satellite positioning system, such as the GPS system, and to process said signals in order to determine the speed and position of the aircraft 10. The speed of the aircraft 10 determined by said receiver will be denoted $V_{GPS}$ hereinafter.

The inertial unit 22 is for example a low- or high-precision inertial unit able to provide the attitudes of the aircraft 10, i.e., the roll $\phi$ and the pitch $\theta$, and the heading $\psi$.

The display 14 is usable by the pilot to pilot aircraft 10 and for example has a head-up display of the HUD type.

This display 14 in particular makes it possible to view different virtual means to help with piloting of the aircraft 10 in a manner conform with the surrounding environment. To that end, the display 14 for example comprises a transparent screen on which said virtual means are projected.

According to one example embodiment, the display 14 is mounted in the pilot's helmet.

The virtual piloting assistance means displayed on the display 14 in particular comprise a speed vector known as "Flight Path Vector".

In a manner known in itself, said vector allows the pilot to determine the drift and flight path angle of the aircraft 10, which are in particular determined from data provided by the navigation system 12. Such a speed vector will be referred to hereinafter as "reference speed vector" to differentiate it from the virtual speed vector described later.

The image sensor 16 makes it possible to acquire images of the surrounding environment. To that end, the image sensor 16 is mounted either outside the aircraft 10 or inside the latter in a location providing outside visibility, such as the cockpit.

The image sensor 16 is oriented in an image acquisition direction that for example corresponds substantially to the movement direction of the aircraft 10.

The image sensor 16 for example has the same field of view as that of the pilot. Advantageously, the image sensor 16 is mounted above the pilot's head, for example on his helmet. In this last case, the sensor 16 is substantially stationary relative to the aircraft 10. In other words, in this case, certain variations in the position of the sensor 16 relative to the aircraft are possible.

In the example described below, the image sensor 16 is a camera making it possible to take successive images of the surrounding environment with a preset or adjustable frequency. These images are in color or monochrome.

However, in the general case, the image sensor 16 can be an infrared sensor, a radar, a lidar or any other apparatus making it possible to differentiate at least certain objects from the surrounding environment. It should then be noted that the term "image" according to the invention corresponds to any depiction of the surrounding environment done by such a sensor.

According to one example embodiment, the image sensor 16 assumes the form of several elementary sensors optionally arranged in different locations. In this case, the term "image" used in the continuation of the description relates to a synthetic image made up of images taken by the set of elementary sensors.

The image sensor 16 in particular defines an optical projection center having the point of intersection of all of the projection lines, each projection line having the direction along which each point in space is projected on the corresponding image.

The image sensor 16 further defines a local coordinate system, called sensor coordinate system $X_c Y_c Z_c$, with origin $O_c$ coinciding with the optical center.

The transformation matrix from the sensor coordinate system $X_c Y_c Z_c$ to the aircraft coordinate system will be denoted $X_1 Y_1 Z_1$ hereinafter.

The determining system 18 according to the invention will now be explained in reference to FIG. 3.

Figure 3:
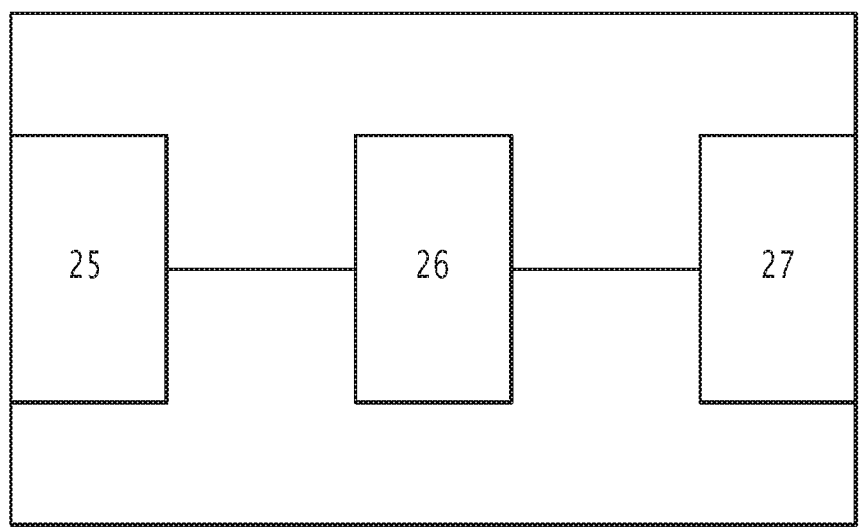
FIG. 3 is a schematic view of the determining system of FIG. 2.

Thus, as shown in FIG. 3, the determining system 18 comprises an acquisition module 25, a processing module 26 and an output module 27.

The acquisition module 25 is connected to the navigation system 12 and the image sensor 16.

It is thus able to acquire information from the navigation system 12 and the images taken by the image sensor 16.

The processing module 26 makes it possible to process data acquired by the module 25 in order to carry out a determining method according to the invention explained in detail hereinafter.

In particular, the processing module 26 makes it possible to determine a virtual speed vector from at least two images taken by the sensor 16.

Lastly, the output module 27 is connected to the display 14 and makes it possible to process data produced by the processing module 26 in order to display them on the display 14, as will be explained hereinafter.

The determining system 18 for example assumes the form of a computer provided with a processor able to execute software stored in a memory thereof. In this case, the modules 26 and 27 assume the form of software programs stored in the memory and run by the processor.

The determining system 18 may further comprise hardware portions, for example programmable logic circuits, to carry out at least certain steps or sub-steps of the determining method.

Figure 4:
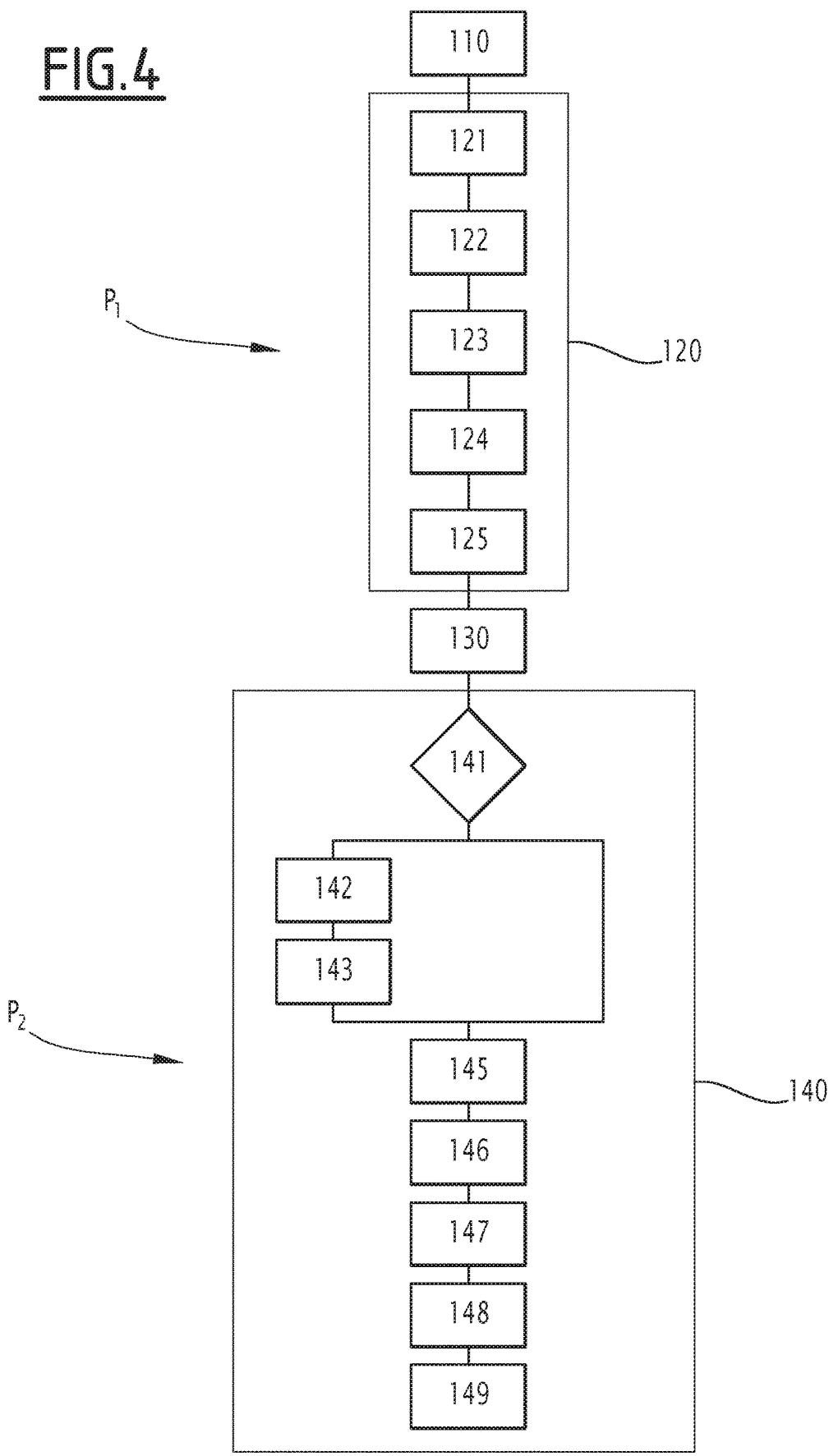
FIG. 4 is a flowchart of a determining method according to the invention, the method being carried out by the determining system of FIG. 2.

The method for determining the virtual speed vector according to the invention will now be explained in reference to FIG. 4, showing a flowchart of its steps.

Said method in particular comprises two phases that may be carried out independently or consecutively.

A first phase $P_1$ of the method makes it possible to determine the virtual speed vector so that it can be displayed on the display 14 for example in place of or in addition to the reference speed vector.

A second phase $P_2$ makes it possible to determine the components of this vector, namely the drift and the flight path angle, so that they can be compared with those of the reference speed vector.

During an initial phase 110 of the first phase $P_1$, the acquisition module 25 acquires a plurality of images taken by the sensor 16 and sends these images to the processing module 26.

During the following phase 120, the processing module 26 analyzes at least two successive images in order to determine a point, called epipole, in each of them.

In particular, the epipole in each of the two images represents the position of the optical center $O_c$ of the image sensor 16 at the moment of the acquisition of the other image.

Figure 5:
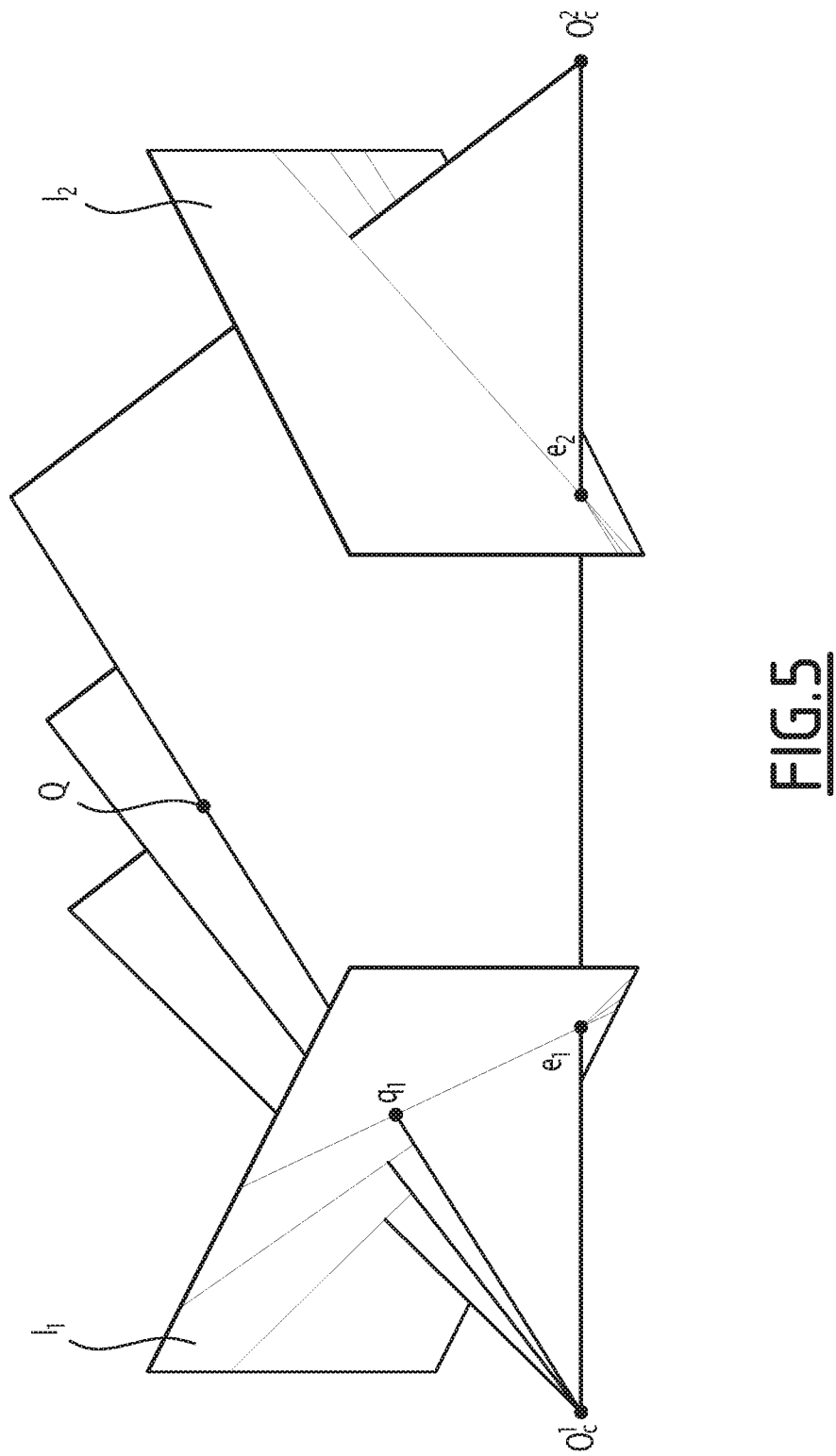
FIG. 5 is a schematic view illustrating the implementation of one of the steps of the determining method of FIG. 4.

The epipoles $e_1$ and $e_2$ of two successive images $I_1$ and $I_2$ respectively taken at moments $t_1$ and $t_2$ in time ($t_1$ being before $t_2$) are illustrated in FIG. 5.

In this FIG. 5, the point $O_c^1$ corresponds to the optical point $O_c$ of the image sensor 16 at the moment $t_1$ and the point $O_c^2$ corresponds to the optical point $O_c$ of the image sensor 16 at the moment $t_2$. Thus, the points of intersection of the line $O_c^1 O_c^2$ with the planes forming the images correspond to the epipoles $e_1$ and $e_2$ of said images.

Furthermore, in a manner known in itself, the epipole of each image is the point of intersection of all of the epipolar lines of said image.

In particular, in the example of FIG. 5, any point Q in space having the point $q_1$ as the projection in the image $I_1$ can project to any point of the line $q_2$ of the image $I_2$. The line $q_2$ is then called epipolar line.

To determine the epipoles in each of the two images, the processing module carries out sub-steps 121 to 125 described below.

During sub-step 121, the processing module 26 determines a plurality of reference points, also called landmarks, in each of the two images.

In particular, a reference point refers to a remarkable point in space that can be recognized in both images. To that end, it is for example possible to associate each determined reference point in one of the two images with a descriptor allowing it to be recognized in the other image.

Then, during sub-step 122, the processing module 26 associates reference points between the two images. This association is for example done by analyzing the descriptors of these points and/or analyzing correlation values in these points, according to methods known in themselves.

Then, during sub-step 123, from the associated reference points, the processing module 26 determines a fundamental matrix F.

This fundamental matrix F is such that for each reference point x' of one of the two images, called first image, and the reference point x associated with it in the other image, called second image, the fundamental matrix F satisfies the following relationship:

$$x'' \cdot F \cdot x = 0.$$

In other words, the fundamental matrix F defines, for each point of the first image, an epipolar line in the second image.

Then, during sub-step 124, the processing module 26 determines the epipole $e_1$ in the first image as the core of the fundamental matrix F.

In other words, the epipole $e_1$ is determined from the following relationship:

$$F \cdot e_1 = 0.$$

Then, during sub-step 125, the processing module 26 determines the epipole $e_2$ in the second image as the core of the transposed fundamental matrix $F^t$.

In other words, the epipole $e_2$ is determined from the following relationship:

$$F^t \cdot e_2 = 0.$$

Lastly, the processing module 26 sends the positions of the determined epipoles to the output module 27.

During the final step 130 of the first phase $P_1$, the output module 27 determines, on the display 14, the conform position of the epipole of the image corresponding to the current moment. The display 14 then displays, in this position, a symbol representative of the virtual speed vector. This symbol is for example similar to that of the reference speed vector and is displayed in place of the latter at least during certain flight phases of the aircraft 10.

The second phase $P_2$ in particular comprises a step 140 during which the processing module 26 compares the virtual speed vector with the reference speed vector.

This step comprises several sub-steps described below, which are for example carried out for the same pair of images as those previously mentioned.

During the first sub-step 141, the processing module 26 analyzes data provided by the inertial sensor 22 in order to detect a rotation of the aircraft 10 between the acquisition moments of the two images.

If this is the case, the processing module 26 carries out steps 142 and 143. Otherwise, the processing module 26 goes directly to step 145.

During steps 142 and 143, the processing module 26 analyzes the two images to eliminate the rotation effect of one of them and therefore to keep only a translational movement between said two images.

To do this, during sub-step 142, the processing module 26 acquires the rotation angles of the image acquisition direction between the two moments in time. These angles are provided either directly by the inertial sensor 22 and correspond to the relative rotation angles between the acquisition moments of the two images, or are preprocessed by acquisition module 25 as a function of the respective positions of the optical center of the image sensor 16 and the inertial sensor 22.

Then, during sub-step 143, the processing module 26 performs a homographic transformation for example of the first image to align the image acquisition direction corresponding to said image with that corresponding to the second image.

This transformation is done as a function of the rotation angles acquired for example according to methods known in themselves.

During step 145, the processing module 26 analyzes a pair of images corresponding to the original two images when no rotational movement of the aircraft 10 has been detected during step 141, or a pair of images with one of the images transformed during steps 142 and 143 otherwise.

In particular, during sub-step 145, the processing module 26 determines a first virtual speed $V_{vc}$ corresponding to the movement speed of the optical center of the image sensor 16 between the images of said pair.

This virtual speed $V_{vc}$ is calculated in the sensor coordinate system $X_c Y_c Z_c$ assuming then that only a translational movement of the sensor has taken place between the acquisitions of the two images.

It should further be noted that, in light of the definition of the sensor coordinate system $X_c Y_c Z_c$, the virtual speed $V_{vc}$ is determined to within a scale factor while accounting for the position of the epipole in at least one of the two images.

Thus, the first virtual speed $V_{vc}$ can be defined from the following relationship:

$$V_{vc} = \begin{bmatrix} \dfrac{e_{1x} - x_0}{u} \\ \dfrac{e_{1y} - y_0}{v} \\ 1 \end{bmatrix},$$

where:

$e_{1x}$ and $e_{1y}$ are the coordinates of the epipole in the first image:

u and v are the focal distances in pixels from the sensor 16; and $x_0$ and $y_0$ are the coordinates of the position of the optical sensor in the first image.

Then, during sub-step 146, the processing module 26 determines a second virtual speed $V_{v1}$ corresponding to the first virtual speed $V_{vc}$ calculated in the aircraft coordinate system $X_1Y_1Z_1$, for example using the following relationship:

$$V_{v1} = R_{c1} V_{vc}.$$

Then during sub-step 147, the processing module 26 determines, from the second virtual speed $V_{v1}$, a virtual drift component $\text{Drift}_v$ of the aircraft 10 and a virtual flight path angle component $\text{FPA}_v$ of the aircraft using the roll $\phi$ and the pitch $\theta$ of the aircraft 10, which are then provided by the inertial sensor 22.

In particular, to calculate the virtual flight path angle $\text{FPA}_v$, the processing module 26 determines the virtual horizontal speed $V_{horv}$ and the virtual vertical speed $V_{zv}$ of the aircraft 10 in the geographical coordinate system XYZ. The virtual flight path angle $\text{FPA}_v$ is then determined according to the following expression:

$$\text{FPA}_v = a \tan V_{zv}/V_{horv}.$$

To calculate the virtual drift $\text{Drift}_v$, the processing module 26 determines the virtual lateral speed $V_{latv}$ and the virtual longitudinal speed $V_{longv}$ of the aircraft 10 and the geographical coordinate system XYZ. The virtual drift $\text{Drift}_v$ is then determined according to the following expression:

$$\text{Drift}_v = a \tan V_{latv}/V_{longv}.$$

Then, during sub-step 148, the processing module 26 determines a reference flight path angle component $\text{FPA}_{ref}$ of the aircraft 10 and compares said component with the virtual flight path angle component $\text{FPA}_v$.

The reference flight path angle $\text{FPA}_{ref}$ is for example determined from the vector $V_{GPS}$, i.e., from the speed vector of the aircraft determined via the GPS system.

To that end, the processing module 26 determines the reference horizontal speed $V_{horref}$ from the north speed $V_N$ and the east speed $V_E$ of the vector $V_{GPS}$ as well as the vertical speed $V_z$, which is given directly by the vector $V_{GPS}$. Thus, the reference flight path angle $\text{FPA}_{ref}$ is determined according to the following expression:

$$\text{FPA}_{ref} = a \tan V_z/V_{horref}.$$

Then, during the same sub-step 148, the processing module 26 compares the reference flight path angle $\text{FPA}_{ref}$ with the virtual flight path angle $\text{FPA}_v$ and, as a function of the result of this comparison, for example associates a confidence level with one or the other of these measurements. This confidence level is for example communicated to the pilot or to an avionics system able to use this result.

During the following sub-step 149, the processing module 26 determines a reference drift component $\text{Drift}_{ref}$ and compares said component with the virtual drift component $\text{Drift}_v$.

To that end, the processing module 26 first acquires, via the module 25, the heading $\psi$ of the aircraft for example provided by the inertial sensor 21.

By knowing the heading $\psi$, the processing module 26 determines the reference lateral speed $V_{latref}$ and the reference longitudinal speed $V_{longref}$ of the aircraft 10, for example from the vector $V_{GPS}$. The reference drift $\text{Drift}_{ref}$ is thus calculated according to the following expression:

$$\text{Drift}_{ref} = a \tan V_{latref}/V_{longref}.$$

At the end of this sub-step 149, the processing module 26 compares the reference drift $\text{Drift}_{ref}$ with the virtual drift $\text{Drift}_v$ and, like in the previous case, based on the result of this comparison, for example associates a confidence level with one or the other of said measurements. Similarly to the previous case, this confidence level is for example communicated to the pilot or is used by an avionics system.

Alternatively, when the measurement of the heading $\psi$ is not available or is not precise enough, instead of calculating the reference drift $\text{Drift}_{ref}$, the processing module 26 calculates, during this sub-step 149, a reference track angle component of the aircraft directly from the vector $V_{GPS}$. The reference track angle is determined from the following relationship:

$$\text{Track}_{ref} = a \tan V_E/V_N.$$

Then during the same sub-step, the processing module 26 compares the reference track angle $\text{Track}_{ref}$ with a virtual track angle $\text{Track}_v$ calculated from the virtual speed vector.

In order to determine the virtual track angle $\text{Track}_v$, the processing module 26 first determines a third virtual speed $V_v$ corresponding to the first virtual speed $V_{vc}$ calculated in the geographical coordinate system XYZ.

This third virtual speed vector $V_v$ is for example calculated using the following relationship:

$$V_v = R_c V_{vc},$$

where $R_c$ is the passage matrix from the camera coordinate system $X_c Y_c Z_c$ to the geographical coordinate system XYZ.

Then, the virtual track angle $\text{Track}_v$ is determined from the following relationship:

$$\text{Track}_{ref} = a \tan V_{Ev}/V_{Nv},$$

where $V_{Ev}$ and $V_{Nv}$ are respectively the east speed and the north speed belonging to the vector of the third virtual speed $V_v$.

The matrix $R_c$ may for example be determined upon initializing the method by comparing the projections of the speed vector $V_{GPS}$ and the first virtual speed vector $V_{vc}$.

At the end of sub-step 149, the processing module 26 compares the virtual track angle $\text{Track}_v$ with the reference track angle $\text{Track}_{ref}$ in a manner similar to that previously explained.

Of course, the algorithm for determining the virtual track angle $\text{Track}_v$ may also be applied to determine the virtual flight path angle during sub-step 147.

One can then see that the invention has a certain number of advantages.

First, the method according to the invention makes it possible to determine a speed vector comparable to the speed vector traditionally used in the aeronautics field.

This virtual speed vector has a good balance between integrity and precision, especially during takeoff and landing of the aircraft. Indeed, during these phases, the surrounding environment of the aircraft has more outside virtual landmarks than for example during the cruising phase. Furthermore, given that during these phases, the aircraft has a reduced speed, the use of the virtual speed vector is particularly advantageous compared to the traditional speed vector.

Furthermore, the virtual speed vector inherently includes instantaneous rotations of the aircraft and can thus be used more to pilot the aircraft relative to the traditional speed vector.

Indeed, it is known that the traditional speed vector accounts for the rotations of the aircraft with a certain delay, which generally makes it impossible to use only this vector to pilot the aircraft.

Furthermore, it is possible to calculate the exact components, namely the drift and the flight path angle, of the virtual speed vector to compare them for example with the analogous components of the traditional speed vector.

The drift and the flight path angle of the aircraft calculated from the virtual speed vector are particularly precise even when a low-precision inertial sensor is used.

Lastly, using the virtual speed vector is particularly advantageous when a head-up display with a conform display is used. Indeed, the virtual speed vector is determined directly from conform images of the surrounding environment, which allows it to be positioned particularly precisely on the corresponding display.

The invention claimed is:

1. A method for determining a virtual speed vector of an aircraft moving in a surrounding environment, the virtual speed vector showing the movement direction of a mobile engine of the aircraft in the environment, the method comprising:
   acquiring a sequence of images of the surrounding environment from an image sensor oriented along an image acquisition direction and defining an optical projection center that is substantially stationary relative to the mobile engine;
   analyzing at least two successive images in order to determine, in each of the two images, a point, designated as an epipole, representing the position in the image of the optical center of the image sensor at the moment of the acquisition of the other image, the analyzing comprising:
      determining a plurality of reference points in one of the two images, designated as the first image, and a plurality of reference points in the other image, designated as the second image;
      associating reference points between the first and second images;
      from associated reference points, determining a fundamental matrix defining, for each point of the first image, a line in the second image, designated as an epipolar line, on which the point of the second image corresponding to the point of the first image is located;
      determining the epipole in the first image as the core of the fundamental matrix; and
      determining the epipole in the second image as the core of a transpose of the fundamental matrix; and
   for each analyzed image:
      determining the position of the epipole of the image on a display usable to pilot the mobile engine; and
      displaying, on the display, a symbol representative of the virtual speed vector in the position of the epipole.

2. The method according to claim 1, wherein said displaying displays the symbol representative of the virtual speed vector on the display in a conform manner.

3. The method according to claim 1, wherein the image sensor is mounted in the mobile engine such that the image acquisition direction substantially corresponds to the movement direction of the mobile engine.

4. The method according to claim 1, wherein the image sensor is mounted on the head of a pilot of the mobile engine.

5. The method according to claim 1, further comprising comparing the virtual speed vector with a reference speed vector determined from information provided by a satellite positioning system and/or an inertial sensor.

6. The method according to claim 5, wherein said comparing comprises, for each pair of analyzed successive images:
   determining a first virtual speed corresponding to the movement speed of the optical center of the image sensor between the images of the pair;
   determining a second virtual speed corresponding to the first virtual speed calculated in the coordinate system of the mobile engine;
   determining, from the second virtual speed, a virtual drift component of the mobile engine and a virtual flight path angle component of the mobile engine by using the roll and pitch of the mobile engine;
   determining, from the reference speed vector, a reference flight path angle component of the mobile engine; and
   comparing the reference flight path angle component with the virtual flight path angle component.

7. The method according to claim 6, wherein said comparing comprises, for each pair of analyzed successive images:
   determining, from the reference speed vector and the heading of the mobile engine, a reference drift component; and
   comparing the reference drift component with the visual drift component.

8. The method according to claim 6, wherein said comparing comprises, for each pair of analyzed successive images:
   determining a third virtual speed corresponding to the first virtual speed calculated in a geographical coordinate system;
   determining, from the third virtual speed, a virtual track angle component of the mobile engine; and
   determining, from the reference speed vector, a reference track angle component of the mobile engine and comparing the reference track angle component with the virtual track angle component.

9. The method according to claim 5, wherein said comparing comprises, for each pair of analyzed successive images, in case of a rotational movement of the mobile engine:
   acquiring rotation angles of the image acquisition direction; and
   based on the acquired rotation angles, performing homographic transformation of one of the images of the pair to align the image direction corresponding to the image with that corresponding to the other image.

10. The method according to claim 1, wherein the mobile engine is an aircraft.

11. A non-transitory computer readable medium comprising software instructions which, when implemented by a piece of computer equipment, cause the piece of computer equipment to carry out the method according to claim 1.

12. A system for determining a virtual speed vector of a mobile engine, including means configured to:
   acquire a sequence of images of the surrounding environment from an image sensor oriented along an image acquisition direction and defining an optical projection center that is substantially stationary relative to the mobile engine;

analyze at least two successive images in order to determine, in each of the two images, a point, designated as an epipole, representing the position in the image of the optical center of the image sensor at the moment of the acquisition of the other image, comprising:
  determine a plurality of reference points in one of the two images, designated as the first image, and a plurality of reference points in the other image, designated as the second image;
  associate reference points between the first and second images;
  from associated reference points, determine a fundamental matrix defining, for each point of the first image, a line in the second image, designated as an epipolar line, on which the point of the second image corresponding to the point of the first image is located;
  determine the epipole in the first image as the core of the fundamental matrix; and
  determining the epipole in the second image as the core of a transpose of the fundamental matrix; and
for each analyzed image:
  determine the position of the epipole of the image on a display usable to pilot the mobile engine; and
  displaying, on the display, a symbol representative of the virtual speed vector in the position of the epipole of the image.

\* \* \* \* \*